(12) United States Patent
Hohlbein

(10) Patent No.: US 9,980,557 B2
(45) Date of Patent: May 29, 2018

(54) ORAL CARE IMPLEMENT AND METHOD OF FORMING AN ORAL CARE IMPLEMENT

(71) Applicant: COLGATE-PALMOLIVE COMPANY, New York, NY (US)

(72) Inventor: Douglas Hohlbein, Hopewell, NJ (US)

(73) Assignee: Colgate-Palmolive Company, New York, NY (US)

( * ) Notice: Subject to any disclaimer, the term of this patent is extended or adjusted under 35 U.S.C. 154(b) by 186 days.

(21) Appl. No.: 14/755,230

(22) Filed: Jun. 30, 2015

(65) Prior Publication Data

US 2015/0296967 A1    Oct. 22, 2015

Related U.S. Application Data

(63) Continuation-in-part of application No. 14/400,956, filed as application No. PCT/US2012/038235 on May 17, 2012, now Pat. No. 9,554,640.

(51) Int. Cl.
| | | |
|---|---|---|
| *A46B 9/04* | (2006.01) | |
| *A46B 15/00* | (2006.01) | |
| *B29C 45/16* | (2006.01) | |
| *B29L 31/42* | (2006.01) | |

(Continued)

(52) U.S. Cl.
CPC ............ *A46B 15/0087* (2013.01); *A46B 9/04* (2013.01); *B29C 45/1642* (2013.01); *B29K 2105/16* (2013.01); *B29K 2995/002* (2013.01); *B29K 2995/0025* (2013.01); *B29K 2995/0026* (2013.01); *B29K 2995/0029* (2013.01); *B29L 2031/425* (2013.01); *B29L 2031/722* (2013.01)

(58) Field of Classification Search
CPC ............ A46B 15/0087; A46B 15/0085; A46B 15/0089; A46B 9/04; A46B 2200/1066; G09F 23/0075

See application file for complete search history.

(56) References Cited

U.S. PATENT DOCUMENTS

| | | | |
|---|---|---|---|
| 5,207,338 A * | 5/1993 | Sandhu | ..................... A61J 9/00 215/11.1 |
| 5,264,267 A | 11/1993 | Wang | |
| 5,440,808 A | 8/1995 | Wexler | |

(Continued)

FOREIGN PATENT DOCUMENTS

| | | |
|---|---|---|
| BG | 4069-0001 | 2/2001 |
| CN | 303054912 | 12/2014 |

(Continued)

OTHER PUBLICATIONS

Computer generated English translation of JP 2002-153322A, May 2002, Moriwaka et al.*

(Continued)

*Primary Examiner* — Laura C Guidotti

(57) ABSTRACT

An oral care implement having a base structure with a handle portion and a head portion. In one aspect, the handle portion comprises a core component and a shell component that surrounds the core component. The core component may include a body formed of a rigid material and decorative elements embedded within the body. The shell component may be formed of a substantially transparent material so that the decorative elements of the core are visible through the shell component.

20 Claims, 12 Drawing Sheets

(51) Int. Cl.
B29K 105/16 (2006.01)
B29L 31/00 (2006.01)

(56) References Cited

U.S. PATENT DOCUMENTS

| | | | |
|---|---|---|---|
| 5,517,712 A | 5/1996 | Schiano | |
| 5,881,425 A | 3/1999 | Hudson et al. | |
| 5,966,769 A | 10/1999 | Tortorice | |
| 6,345,406 B1 | 2/2002 | Dodd | |
| 6,464,920 B1 | 10/2002 | Kraemer | |
| 6,919,038 B2 | 7/2005 | Meyer et al. | |
| 2002/0124864 A1 | 9/2002 | Gross et al. | |
| 2003/0070259 A1 | 4/2003 | Brown et al. | |
| 2003/0070309 A1* | 4/2003 | Brown | B26B 21/52 30/535 |
| 2003/0135943 A1 | 7/2003 | Meyer et al. | |
| 2005/0015907 A1 | 1/2005 | Georgi et al. | |
| 2005/0050662 A1* | 3/2005 | Williams | A45D 33/36 15/143.1 |
| 2005/0193510 A1 | 9/2005 | Kemp | |
| 2007/0151058 A1 | 7/2007 | Georgi et al. | |
| 2010/0000039 A1 | 1/2010 | Vega-Cortes | |
| 2010/0101037 A1* | 4/2010 | Gross | C25D 3/48 15/167.1 |
| 2013/0174366 A1* | 7/2013 | Stebila | A46B 9/04 15/143.1 |
| 2013/0198986 A1 | 8/2013 | Mantell et al. | |
| 2014/0173853 A1 | 6/2014 | Kirchhofer et al. | |
| 2014/0178650 A1 | 6/2014 | Schnurr | |
| 2015/0164211 A1 | 6/2015 | Hohlbein | |

FOREIGN PATENT DOCUMENTS

| | | | | |
|---|---|---|---|---|
| CZ | 30645-0001 | 11/2001 | | |
| CZ | 32613-0001 | 2/2005 | | |
| EP | 0 673 743 | 9/1995 | | |
| JP | 2002-153322 A | * | 5/2002 | ............... A46B 5/00 |
| JP | D1259839 | 1/2006 | | |
| JP | D1321142 | 2/2008 | | |
| SE | 54130-0001 | 8/1993 | | |
| SK | 702001000000154-0001 | 3/2002 | | |
| WO | WO 2009/148440 | 12/2009 | | |
| WO | WO 2012/105964 | 8/2012 | | |

OTHER PUBLICATIONS

International Search Report and the Written Opinion issued in International Application PCT/US2012/038235 dated Feb. 7, 2013.
Kids' Sparkle Toothbrush, SmartPractice.com, 2011-2014, 1 p.
Supersmile Crystal Collection Toothbrush, Drugstore.com, 1999-2015, 6 pp.

* cited by examiner

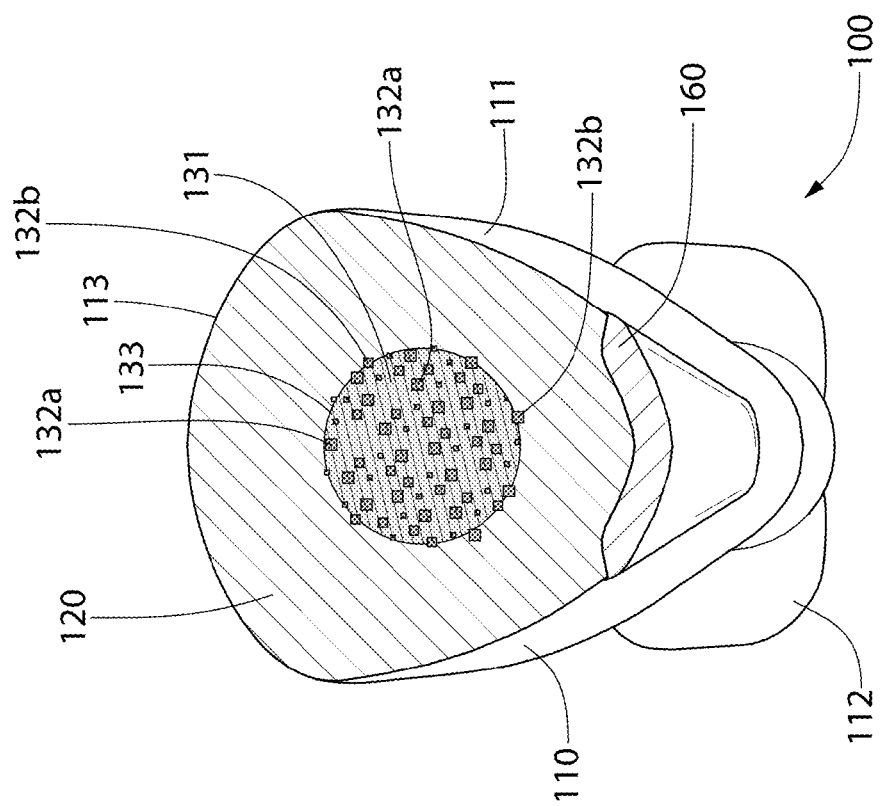
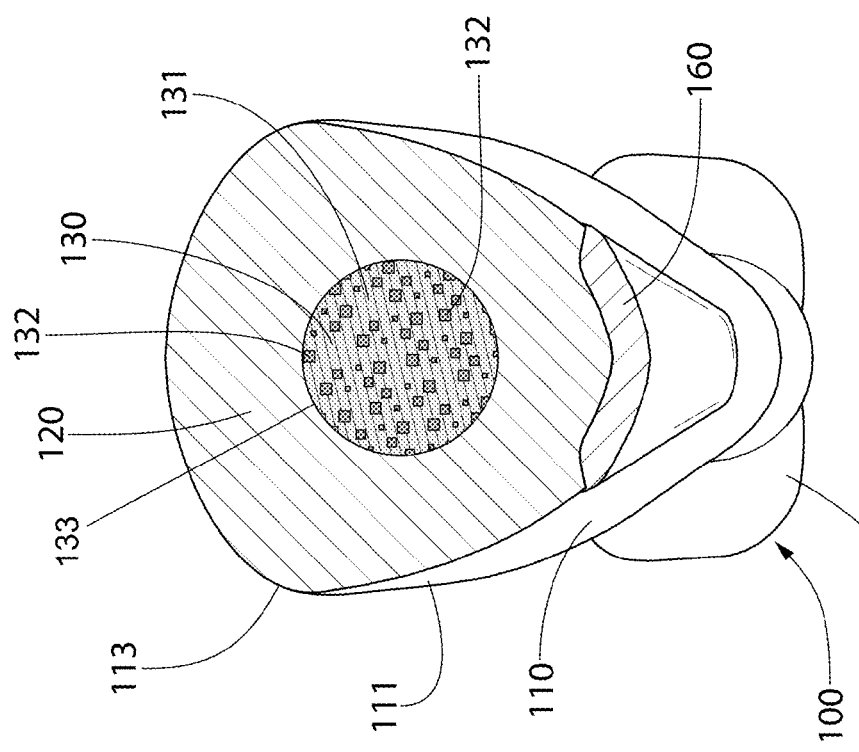

ORAL CARE IMPLEMENT AND METHOD OF FORMING AN ORAL CARE IMPLEMENT

CROSS-REFERENCE TO RELATED APPLICATIONS

The present application is a continuation-in-part of U.S. patent application Ser. No. 14/400,956, filed Nov. 13, 2014, which is a U.S. national stage application under 35 U.S.C. § 371 of Patent Cooperation Treaty Application No. PCT/US2012/038235, filed May 17, 2012, the entireties of which are incorporated herein by reference.

BACKGROUND

The oral care implement industry is rather competitive and innovation of an oral care implement with desirable aesthetics is desired. Current trends to enhance the aesthetics of oral care implements includes forming oral care implements in multiple mold cavities or out of multiple components that must be coupled together. Thus, a continued need exists for an oral care implement with a desirable and attractive appearance that is eye catching and simple in design.

BRIEF SUMMARY

The present invention may be directed, in one aspect, to an oral care implement having a base structure that includes a core component and a shell component. The core component may include a body and decorative elements therein. The shell component may be a transparent rigid material. Thus, the decorative elements of the core component are visible through the shell component to achieve a desirable aesthetic effect. In other embodiments the present invention may be directed to a method of forming such an oral care implement.

In one embodiment, the invention can be an oral care implement comprising: a base structure comprising a core component and a shell component surrounding the core component; the shell component comprising a substantially translucent first rigid material; and the core component comprising a body formed of a second rigid material and a plurality of decorative elements, the plurality of decorative elements dispersed throughout the body and visible through the shell component.

In another embodiment, the invention can be an oral care implement comprising: a base structure comprising a handle portion and a head portion, tooth cleaning elements extending from the head portion; the handle portion comprising a core component and a shell component, the shell component surrounding the core component and forming an outer surface of the base structure; the shell component formed of a substantially translucent first material; the core component comprising a body formed of a second rigid material and a plurality of decorative elements, the plurality of decorative elements forming a part of an outer surface of the core component, the plurality of decorative elements of the core component being visible through the substantially translucent first material of the shell component.

In yet another embodiment, the invention can be a method of forming an oral care implement comprising: a) providing a first mold that defines a first mold cavity, the first mold cavity having a shape that corresponds with a shape of a base structure of the oral care implement; b) injecting a first material into the first mold cavity, the first material being transparent or translucent; and c) injecting a second material into the first material in the first mold cavity thereby displacing the first material within the first mold cavity and forming the base structure, the second material forming a core component of the base structure and the first material forming a shell component of the base structure that surrounds the core component; and wherein a plurality of decorative elements are dispersed throughout the second material of the core component and visible through the first material of the shell component.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4A is a cross-sectional view taken along line IV-IV of FIG. 3.

FIG. 4B is a cross-sectional view taken along line IV-IV of FIG. 3 in accordance with an alternative embodiment of the present invention.

DETAILED DESCRIPTION

Figure 1:
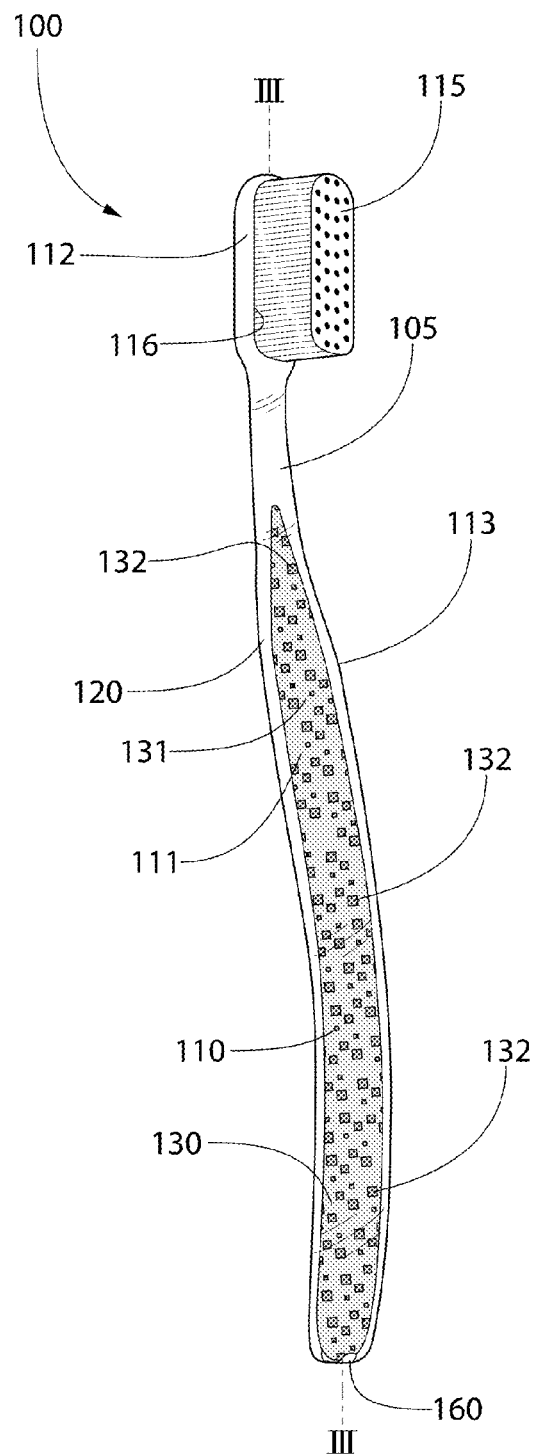
FIG. 1 is a front perspective view of an oral care implement in accordance with a first embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Figure 2:
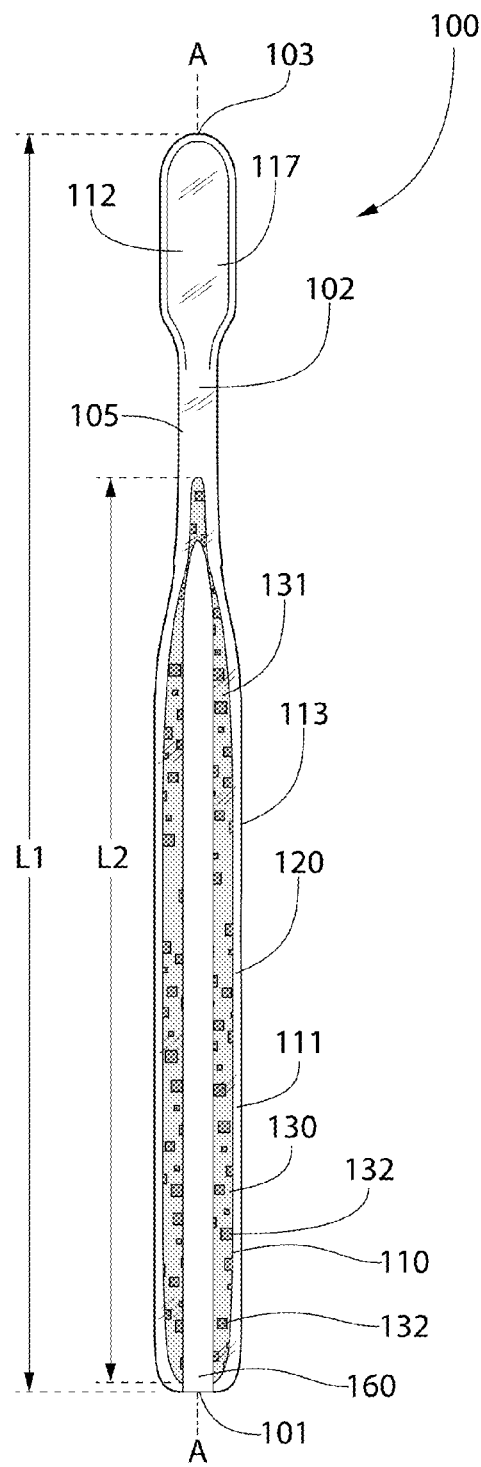
FIG. 2 is a rear view of the oral care implement of FIG. 1.
Figure 3:
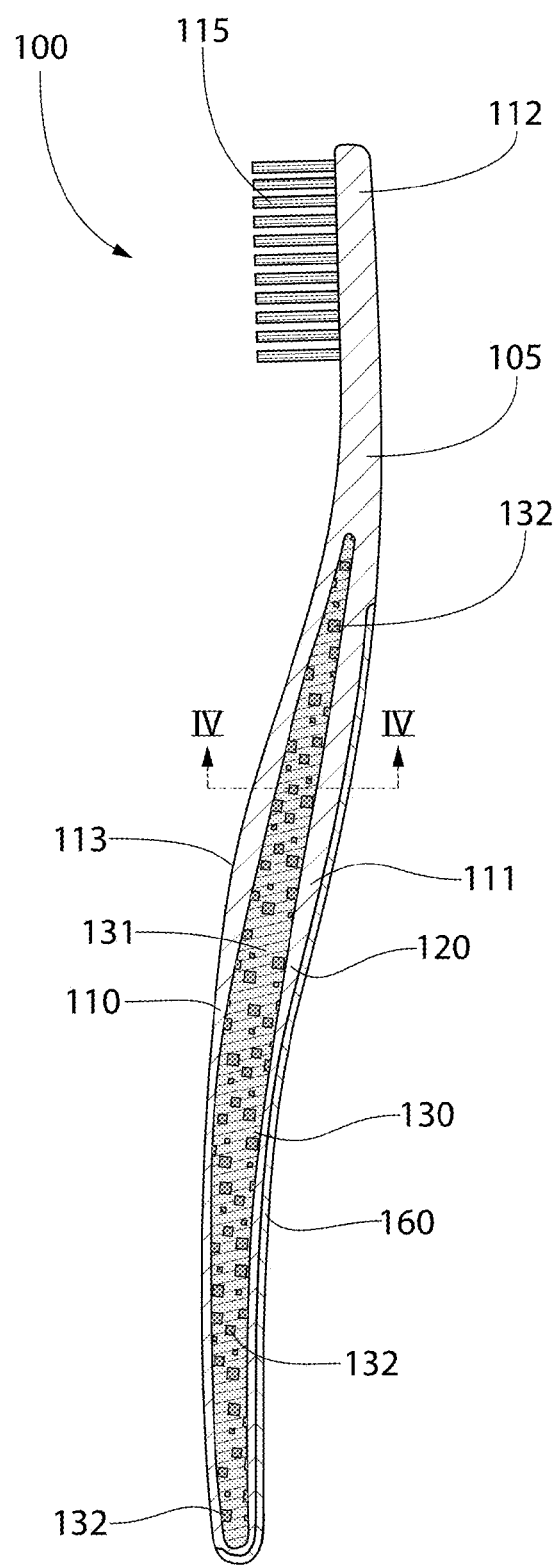
FIG. 3 is a cross-sectional view taken along line III-III of FIG. 1.

Referring first to FIGS. 1 and 2 concurrently, an oral care implement 100 is illustrated in accordance with one embodiment of the present invention. In the exemplified embodiment, the oral care implement 100 is in the form of a manual toothbrush. However, in certain other embodiments the oral care implement 100 can take on other forms such as being a powered toothbrush, a tongue scraper, a gum and soft tissue cleanser, a water pick, an interdental device, a tooth polisher, a specially designed ansate implement having tooth engaging elements, or any other type of implement that is commonly used for oral care. Furthermore, in still other embodiments the implement may not be limited to one that is used for oral care, and may be any type of personal care implement such as a manual or electric razor, a hairbrush, or the like. Thus, it is to be understood that the inventive concepts discussed herein can be applied to any type of oral or personal care implement unless a specific type of oral or personal care implement is specified in the claims.

In the exemplified embodiment, the oral care implement 100 comprises a base structure 110 and an elastomeric overmold 160. The base structure 110 is formed of one or more rigid plastic materials such as for example without limitation polymers and copolymers of ethylene, propylene, butadiene, vinyl compounds, polyesters such as polyethylene terephthalate (PET), styrene-acrylonitrile (SAN), polyurethane, polyamide, cellulosic, acrylic, acrylonitrile butadiene styrene (ABS), or the like. The base structure 110 has an outer surface 113 and the elastomeric overmold 160 is coupled to the outer surface 113 such as by injection molding, adhesion, fasteners, or the like.

In certain embodiments the elastomeric overmold 160 may form a grip to prevent slippage and enhance comfort during use of the oral care implement 100, although the elastomeric overmold 160 may also be omitted in certain embodiments as desired. The elastomeric overmold 160 may be formed of a thermoplastic elastomer or other rubber-like material that enhances comfort and gripability of the oral care implement 100 during use. Although in the exemplified embodiment the elastomeric overmold 160 is only illustrated in a strip on the rear surface of the handle portion 111 of the base structure 110, the invention is not to be so limited. In other embodiments the elastomeric overmold 160 may extend onto the front surface of the base structure 110 to form a forefinger and thumb grip to increase comfort and prevent slippage during use. Furthermore, the elastomeric overmold 160 may extend onto the rear surface of the head portion 112 of the base structure 110 to operate as a tongue and soft tissue cleanser. The elastomeric overmold 160 may also extend onto the front surface of the head portion of the base structure 110 to operate as a rubber tooth polishing member. The elastomeric overmold 160 may be a single unitary piece formed via a single shot in an injection mold or may include several discontinuous or separated segments formed of the elastomeric material via multiple shots in an injection mold. Furthermore, various textures, protrusions, channels, ridges, or the like may be formed as part of the elastomeric overmold 160.

In certain exemplified embodiments, the base structure 110 comprises a handle portion 111 and a head portion 112. The handle portion 111 of the base structure 110 extends from a proximal end 101 of the oral care implement 100 to a distal end 102 of the handle portion 111. Thus, in the exemplified embodiment the handle portion 111 includes the portion of the oral care implement 100 that is gripped during use and a neck 105 of the oral care implement 100 that forms the transition region between the handle portion 111 and the head portion 112. The handle portion 111 of the base structure 110 is an elongated structure that provides the mechanism by which the user can hold and manipulate the oral care implement 100 during use. In the exemplified embodiment, the handle portion 111 is generically depicted having various contours for user comfort. Of course, the invention is not to be limited by the specific shape illustrated for the handle portion 111 in all embodiments and in certain other embodiments the handle portion 111 can take on a wide variety of shapes, contours, and configurations, none of which are limiting of the present invention unless so specified in the claims.

The head portion 112 of the base structure 110 extends from the distal end 102 of the handle portion 111 to a distal end 103 of the head portion 112. In the exemplified embodiment, a plurality of tooth cleaning elements 115 are coupled to and extend from the head portion 112 of the base structure 110. The term "tooth cleaning elements" is used in a generic sense to refer to any structure that can be used to clean, polish, or wipe the teeth and/or soft oral tissue (e.g. tongue, cheek, gums, etc.) through relative surface contact. Common examples of "tooth cleaning elements" include, without limitation, bristle tufts, filament bristles, fiber bristles, nylon bristles, spiral bristles, rubber bristles, elastomeric protrusions, flexible polymer protrusions, combinations thereof and/or structures containing such materials or combinations. The tooth cleaning elements may include tapered bristles, non-tapered (i.e., end rounded) bristles, and combinations thereof. Any combination of the various types of tooth cleaning elements may be used on the oral care implement 100 in different embodiments.

In embodiments that use elastomeric elements as one or more of the tooth cleaning elements 115, suitable elastomeric materials may include any biocompatible resilient material suitable for uses in an oral hygiene apparatus. To provide optimum comfort as well as cleaning benefits, the elastomeric material of any such tooth or soft tissue engaging elements may have a hardness property in the range of A8 to A25 Shore hardness. One suitable elastomeric material is styrene-ethylene/butylene-styrene block copolymer (SEBS) manufactured by GLS Corporation. Nevertheless, SEBS material from other manufacturers or other materials within and outside the noted hardness range could be used. The tooth cleaning elements 115 may be coupled to the head portion 112 of the base structure 110 using any technique known in the art, such as stapling, anchor free tufting, in-mold tufting, AMR, or the like. The invention is not to be limited by the manner in which the tooth cleaning elements 115 are coupled to the head portion 112 in all embodiments.

The head portion 112 of the oral care implement 100 is coupled to the handle portion 111 and comprises a front surface 116 and an opposing rear surface 117. The tooth cleaning elements 115 extend from the front surface 116 of the head portion 112. A tongue or soft tissue cleaner (not depicted) may be positioned on the rear surface 117 of the head portion 112. In the exemplified embodiment, the head portion 112 is formed integrally with the handle portion 111 as a single unitary structure using a molding, milling, machining, or other suitable process. However, in other embodiments the handle portion 111 and the head portion 112 may be formed as separate components which are operably connected at a later stage of the manufacturing process by any suitable technique known in the art, including without limitation thermal or ultrasonic welding, a tight-fit assembly, a coupling sleeve, threaded engagement, adhesion, or fasteners. Thus the handle portion 111 and the head portion 112 may, in certain embodiments, be formed of any of the rigid plastic materials described above, although the invention is not to be so limited in all embodiments and other materials that are commonly used during toothbrush manufacture may also be used.

Referring to FIGS. 1-4A concurrently, the oral care implement 100 will be further described. The base structure 110 of the oral care implement 100 extends from the proximal end 101 of the handle portion 111 to the distal end 103 of the head portion 112 along a longitudinal axis A-A. The base structure 110 of the oral care implement 100 comprises a shell component 120 and a core component 130. In the exemplified embodiment, only the handle portion 111 of the base structure 110 comprises the shell and core components 120, 130 and the head portion 112 of the base structure 110 comprises only the shell component 120. Thus, in certain embodiments the shell component 120 and the core component 130 collectively form the handle portion 111 of the base structure 110. However, in the exemplified embodiment the core component 130 does not extend to the head portion 112 of the base structure 110. Thus, in the exemplified embodiment the shell component 120 forms an entirety of the head portion 112 of the base structure 110.

Stated another way, the base structure 110 has a length $L_1$ measured from the distal end 101 of the handle portion 111 to the distal end 103 of the head portion 112. The shell component 120 extends the entire length $L_1$ of the base structure 110. The core component 130 has a length $L_2$ that is less than the length $L_1$ of the base structure 110 so that although the core component 130 extends from adjacent to the proximal end 101 of the base structure 110, the core component 130 does not extend into the head portion 112 of the base structure 110. Of course, the length $L_2$ of the core component 130 may be adjusted in certain embodiments so that the core component 130 may extend into the head portion 112 in some embodiments if so desired. The core component 130 is elongated in a direction of the longitudinal axis A-A and may taper in a direction towards the head portion 112. The core component 130 may extend along an entirety of the handle portion 111 of the base structure 110 and approximately two-thirds to three-fourths of the length $L_1$ of the base structure 110. Thus, a ratio $L_1:L_2$ may be between 1.3:1 to 1.5:1, or more specifically 1.35:1 to 1.45:1.

The core component 130 forms an interior longitudinal section of the base structure 110 and the shell component 120 forms an exterior longitudinal section of the base structure 110. Thus, at any transverse plane taken through the base structure 110 that intersects both the shell and core components 120, 130, the shell component 120 has a diameter that is greater than a diameter of the core component 130. Thus, the shell component 120 substantially surrounds the core component 120. More specifically, the core component 130 is substantially entirely surrounded or enclosed by the shell component 120. Stated another way, the core component 130 is circumferentially surrounded by the shell component 120 along its entire length so that no portion of the core component 130 is exposed. In the exemplified embodiment, the shell component 120 completely surrounds the core component 120 so that the entire outer surface 113 of the base structure 110 is formed by the shell component 120 and no portion of the core component 130 extends to and is exposed on the outer surface 113 of the base structure 110.

Thus, the core component 130 appears to float within the shell component 120. The shell component 120 may be formed of a transparent material and the core component 130 may be formed of an opaque material (or a translucent material or a tinted material) so that the core component 130 is visible through the shell component 120 to achieve a desirable aesthetic effect. As discussed in more detail below, the core component 130 may comprise a body 131 and a plurality of decorative elements 132 that are visible through the shell component 120 to enhance the aesthetic effect. The plurality of decorative elements 132 may be dispersed throughout the body 131 or located within certain regions of the body 131.

In the exemplified embodiment the core component 130 tapers towards the head portion 112 of the base structure 110 such that the cross-sectional area of the core component 130 decreases as the core component 130 extends away from the proximal end 101 of the handle portion 111 of the base structure 110 towards the head portion 112 of the base structure 110. However, the invention is not to be limited by the shape, length, thickness, and size of the core component 130 in all embodiments unless specifically claimed as such. The core component and shell component 120, 130 of the base structure 110 can be formed using sandwich molding technologies in a single mold cavity as described in more detail below with reference to FIGS. 11-13, or by using multiple mold cavity injection molding processes.

In the exemplified embodiment, the shell component 120 comprises a substantially translucent first material. As used herein, the term translucent may include materials that are translucent that transmit and diffuse light so that objects cannot be seen clearly through the material and materials that are transparent and allow all light to pass through so that objects can be seen clearly through the material. The term translucent does not include materials that are opaque such that objects cannot be seen through the material at all. Thus, as used herein translucent should be interpreted to mean translucent and/or transparent. Materials that are translucent may be tinted. Specifically, in some embodiments the first material of the shell component 120 may be tinted and translucent. Tinted/translucent materials may be desirable for the shell component 120 to add to the aesthetics of the oral care implement 100. When the term transparent is used herein it should be understood to mean transparent but not also translucent. In some embodiments transparent materials may be desired for the shell component 120 to ensure that the core component 130 and the decorative elements 132 dispersed within the body 131 thereof are readily visible through the shell component 120.

Furthermore, the first material is a rigid material because it forms the main structure of the handle portion 111 and head portion 112 of the base structure 110 of the oral care implement 100. Thus, the first material is rigid to ensure that the oral care implement 100 can be handled without bending or flexing during use. The term rigid material does not mean that the material can not bend at all because all materials will bend if a sufficient force is applied thereto. Rather, the term rigid material refers to a hard material that resists bending/flexing under normal toothbrushing pressures and forces. Thus, during normal toothbrushing the shell component 120 will retain its shape without significant flexing or bending. In certain embodiments the first material of the shell component 120 may be a hard plastic material such as copolyester, polyethylene terephthalate (PET), styrene-acrylonitrile (SAN), polyurethane, polyethylene, polyamide, cellulosic, acrylic, acrylonitrile butadiene styrene (ABS), or the like or any of the other materials described above as forming a part of the base structure 110 of the oral care implement 100. Thus, in embodiments of the invention the first material of the shell component 120 does not include elastomeric materials such as thermoplastic elastomers (TPE), rubbers, or the like.

Furthermore, as noted above, in the exemplified embodiment the shell component 120 is substantially translucent or transparent. Thus, regardless of the degree of translucency/transparency of the shell component 120, the shell component 120 is not opaque so that the shell component 120 can be at least partially seen through. As a result, the core component 130 is visible through the shell component 120 despite the core component 130 being substantially or entirely surrounded or encapsulated/enveloped by the shell component 120. In certain embodiments the shell component 120 is completely clear and completely transparent. In other embodiments the shell component 120 is tinted with a color but is still translucent.

In the exemplified embodiment, the core component 130 comprises a body 131 formed of a second material and a plurality of decorative elements 132 dispersed throughout or embedded within the body 131. In certain embodiments the second material that forms the body 131 of the core component 130 may also be a rigid material, such as any of the hard plastic materials described above for the first material of the shell component 120. Furthermore, the second material that forms the body 131 may be transparent, translucent, or opaque and may include various different colors as will be discussed in more detail below. Different degrees of transparency and different colors can be used for the body 131 of the core component 130 to achieve a desired aesthetic.

In FIGS. 1-4A, the shell component 120 is substantially translucent or transparent so that the core component 130 is visible through the shell component 120. Furthermore, the core component 130 is depicted in grayscale to indicate that the core component 130 is not transparent, but rather is translucent or opaque and includes a color. Furthermore, the plurality of decorative elements 132 are depicted as having a different grayscale than the core component 130 to indicate that the decorative elements 132 are preferably opaque and may have a different color than the core component 130 so that they are readily visible through and within the core component 130.

In the exemplified embodiment, the plurality of decorative elements 132 comprises a plurality of particles that are located within the body 131 of the core component 130 and visible through the shell component 120. In certain embodiments, the decorative elements 132 are a plurality of discrete and spaced apart particles. In embodiments wherein the decorative elements 132 are particles, the particles may be speckles, sparkles, flakes, glitter, microspheres, pearlescent particles, or the like. The particles may be flat, two dimensional structures or shaped three-dimensional structures. The particles may take on any desired shape, including polygonal shapes, round shapes, combinations thereof, or the like. The particles may be formed of any desired material, including elastomeric materials, rigid plastics, wood, glass, metal, sand, or the like. In certain embodiments the particles will have a higher melting temperature than the material that forms the body 131 so that the particles retain their shape and do not melt during an injection molding process that forms the core component 130. The main purpose of the particles is aesthetic, and thus any material that may be visible within the body 131 of the core component 130 to achieve the desired aesthetic effect can be used for the particles/decorative elements 132.

In the exemplified embodiment, at least one of the plurality of decorative elements 132 forms a part of an outer surface 133 of the core component 130. Thus, the at least one of the plurality of decorative elements 132 and the body 131 collectively forms the outer surface 133 of the core component 130. The at least one of the plurality of decorative elements 132 may thus be located at an interface between the shell component 120 and the core component 130. As a result, the at least one of the plurality of decorative elements 132 is exposed at the outer surface 133 of the core component 130. Specifically, if the shell component 120 were somehow removed, the decorative element(s) 132 located at the outer surface 133 of the core component 130 would be completely exposed rather than being embedded within the material of the body 132 of the core component 130.

Although described herein as having at least one of the plurality of decorative elements 132 forming a part of the outer surface 133 of the core component 130, in the exemplified embodiment there are many of the decorative elements 132 so located at the outer surface 133 of the core component 130. Locating at least one, and preferably several or many, of the plurality of decorative elements 132 at the outer surface 133 of the core component 130 ensures that the decorative elements 132 are visible, particularly in instances where the core component 130 is opaque and decorative elements 132 embedded within the core component 130 may be difficult if not impossible to see. In this manner, the visual effects described herein can be achieved even when the core component 130 is opaque.

In certain embodiments the body 131 comprises a first color and at least one of the particles of the plurality of decorative elements 132 comprises a second color that is different than the first color. The first and second colors can be different even if they are different shades of the same color (i.e., sky blue and steel blue are different shades of blue; crimson and ruby are different shades of red, etc.). Furthermore, in some embodiments the plurality of decorative elements 132 may all be the same color. In other embodiments several of the plurality of decorative elements 132 may be different colors relative to each other. Furthermore, in some embodiments the body 131 may be colored and one or more of the decorative elements 132 may be transparent. In certain embodiments it is merely desirable that the plurality of decorative elements 132 are visible through the shell component 120 and through/within the body 131 of the core component 130. Thus, the various colors and transparencies of the shell component 120, body 131, and decorative elements 132 can be selected to achieve this aesthetic purpose.

In still other embodiments the elastomeric overlay 160 may have a color that is the same as one of the color of the body 131 of the core component 130 or the color of the decorative elements 132 dispersed or embedded within the body 131 of the core component 130. Thus, the elastomeric overlay 160 and the body 131 may be a first color and the decorative elements 132 may be a second color. Alternatively, the elastomeric overlay 160 and the decorative elements 132 may be a first color and the body 131 may be a second color. In still other embodiments each of the elastomeric overlay 160, the body 131 and the decorative elements 132 may be a different color or the same color. Thus, many permutations and variations are possible to create a desired aesthetic effect.

Referring briefly to FIG. 4B, an alternative embodiment is depicted in which some of the plurality of decorative elements 132a are embedded within the body 131 and/or form a portion of the outer surface 133 of the body 131 and others of the plurality of decorative elements 132b protrude from the outer surface 133 of the body 131. This can create a visibly appealing three-dimensional appearance of the decorative elements 132 as they are viewed through the shell component 120. In either embodiment (FIG. 4A and/or FIG. 4B), the decorative elements 132 may collectively take on a specific shape, such as the shape of a television character, the shape of a logo, the shape of a company or individual's name, or the like. Thus, the decorative elements 132 may be used to convey a message to a consumer or take on an appearance that may be desirable for children. In some embodiments, the decorative elements 132a embedded within the body 131 and the decorative elements 132b protruding from the outer surface 133 of the body 131 may together form the shape of a character, logo, name, or the like. In other embodiments, the decorative elements 132 may be randomly dispersed within the body 131.

Figure 5:
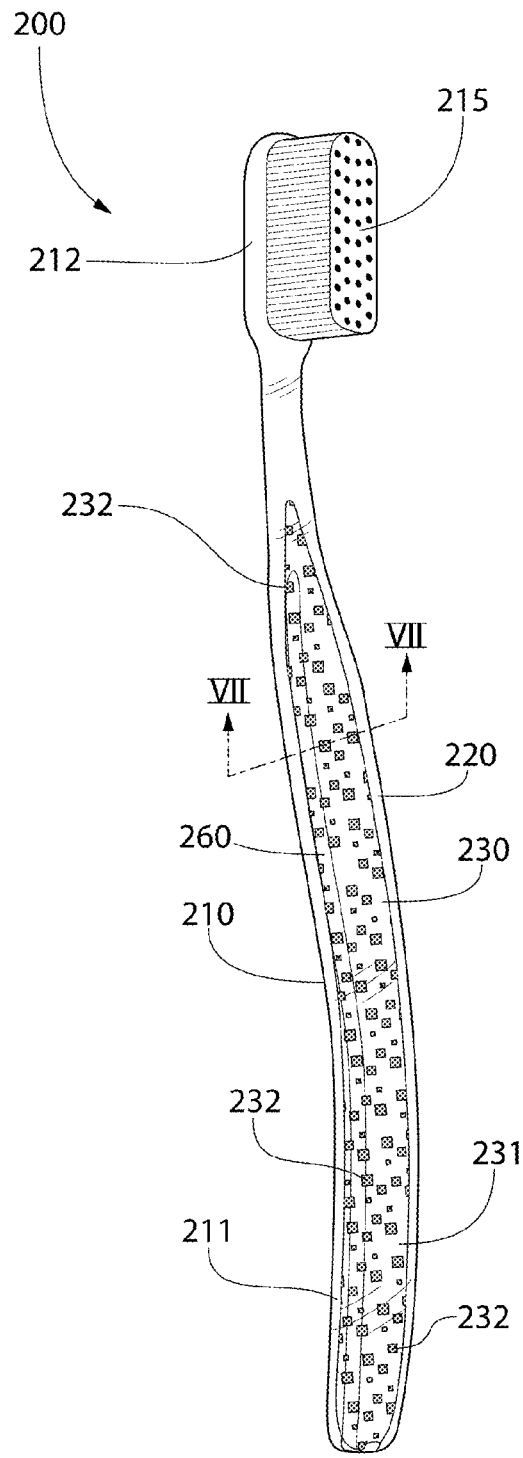
FIG. 5 is a front perspective view of an oral care implement in accordance with a second embodiment of the present invention.
Figure 6:
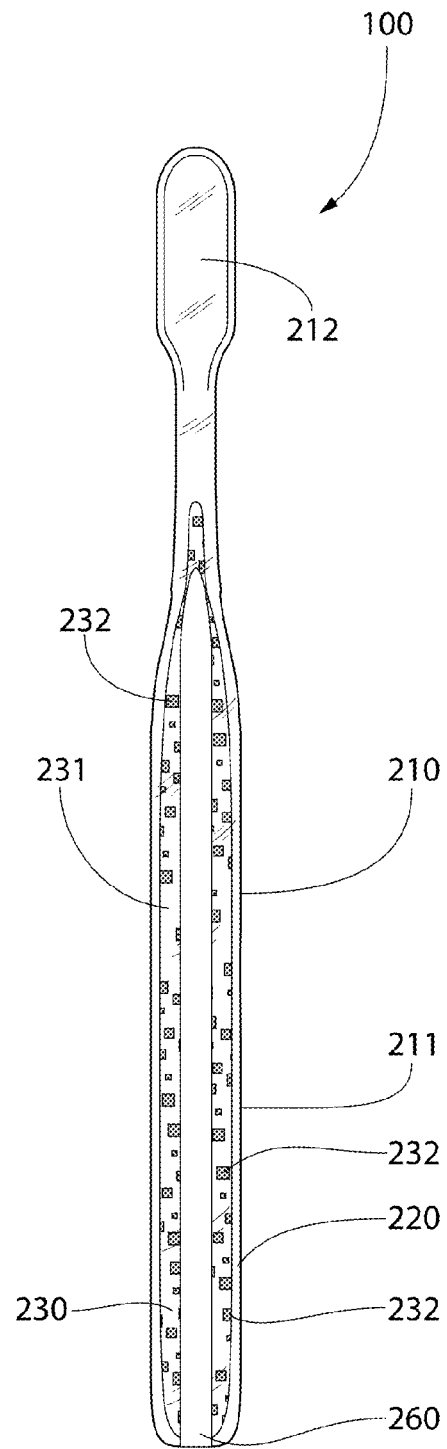
FIG. 6 is a rear view of the oral care implement of FIG. 5.
Figure 7:
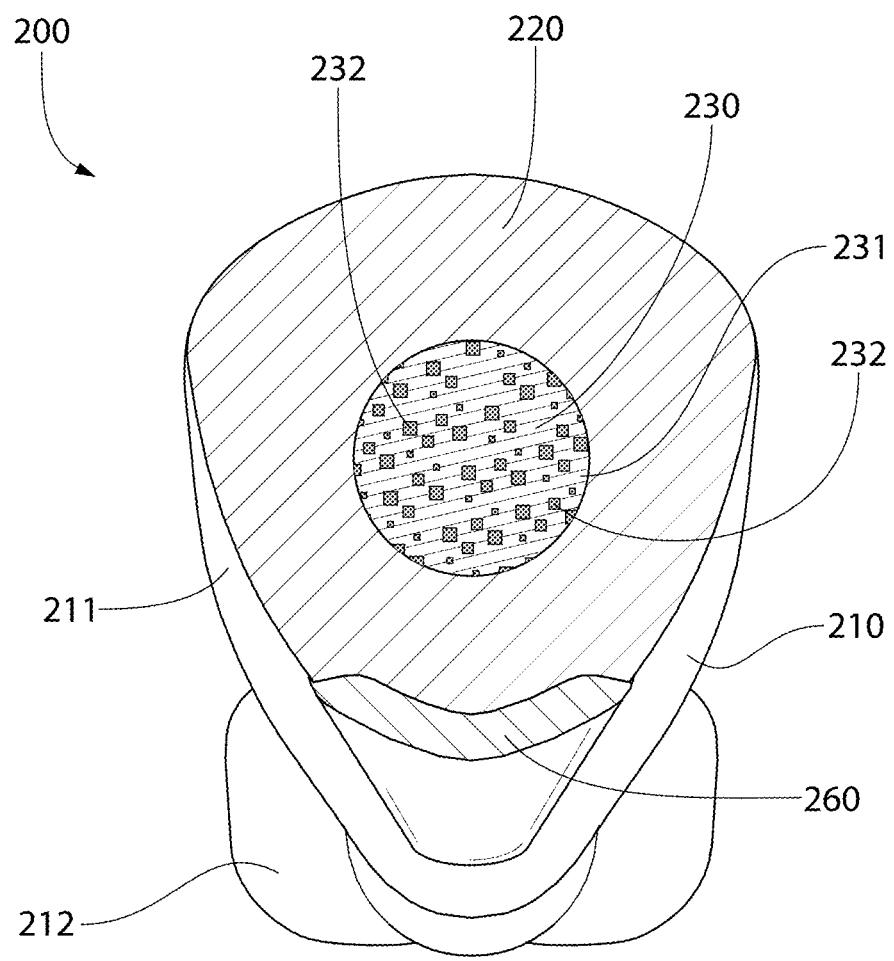
FIG. 7 is a cross-sectional view taken along line VII-VII of FIG. 6.

Referring to FIGS. 5-7 concurrently, another embodiment of an oral care implement 200 will be described. The oral care implement 200 is similar to the oral care implement 100 in many respects, and thus features of the oral care implement 200 that are similar to or the same as features of the oral care implement 100 will not be described in detail herein, it being understood that the description of the similar feature in the oral care implement 100 applies. Some of the features that are not described will be numbered similarly to the similar feature in the oral care implement 100 except that the 200-series of numbers will be used. Thus, the similar features among the oral care implements 100, 200 should be readily apparent based on the numbering used in the drawings.

The oral care implement 200 comprises a base structure 210 having a handle portion 211 and a head portion 212. Furthermore, the base structure 210 comprises a shell component 220 and a core component 230, the shell component 220 substantially surrounding the core component 230. The shell component 220 and the core component 230 are similar in structure, hardness, and material to the same features described above in the oral care implement 100 and thus in the interest of brevity these details will be omitted with regard to the oral care implement 200, it being understood that the description above is applicable.

The main difference between the oral care implement 200 and the oral care implement 100 is that the core component 230 of the oral care implement 200 is substantially transparent rather than being depicted in grayscale as with the oral care implement 100. Thus, in the oral care implement 200 the shell component 220 is translucent or transparent and the core component 230 is substantially translucent or transparent. In one embodiment, the shell and core components 220, 230 may both be completely transparent so that all light passes through the shell and core components 220, 230 without being scattered. In other embodiments one of the shell and core components 220, 230 may be translucent and not transparent while the other is transparent or both of the shell and core components 220, 230 may be translucent and not transparent and may be tinted with the same, similar, or different colors to achieve a desired aesthetic effect. Although the core component 230 is identifiable in the drawings due to the line outlining the boundary of the core component 230, in practice the core component 230 may blend in completely with the shell component 220 so that a consumer can not tell that there are two different components forming the base structure 210 of the oral care implement 200. This is particularly true when both the shell and core components 220, 230 are transparent or otherwise formed of a material having an identical color.

In this embodiment, the core component 230 comprises a body 231 and a plurality of decorative elements 232 dispersed or embedded within the body 231. Thus, to a user who can not visually see the distinction between the shell component 220 and the core component 230, it appears that the decorative elements 232 are freely suspended within the base structure 210 but are limited to some parts of the base structure 210 rather than being dispersed throughout the entirety of the base structure 210. Specifically, the decorative elements 232 are located within the body 131 of the core component 230 and not also within the shell component 220, so the decorative elements 232 are only visible in parts of the base structure 210 that include the core component 230. Thus, the decorative elements 232 appear to be freely suspended within some portions of the handle portion 211 of the base structure 210 but not within other portions of the handle portion 211 or the head portion 212 of the base structure 210.

Figure 8:
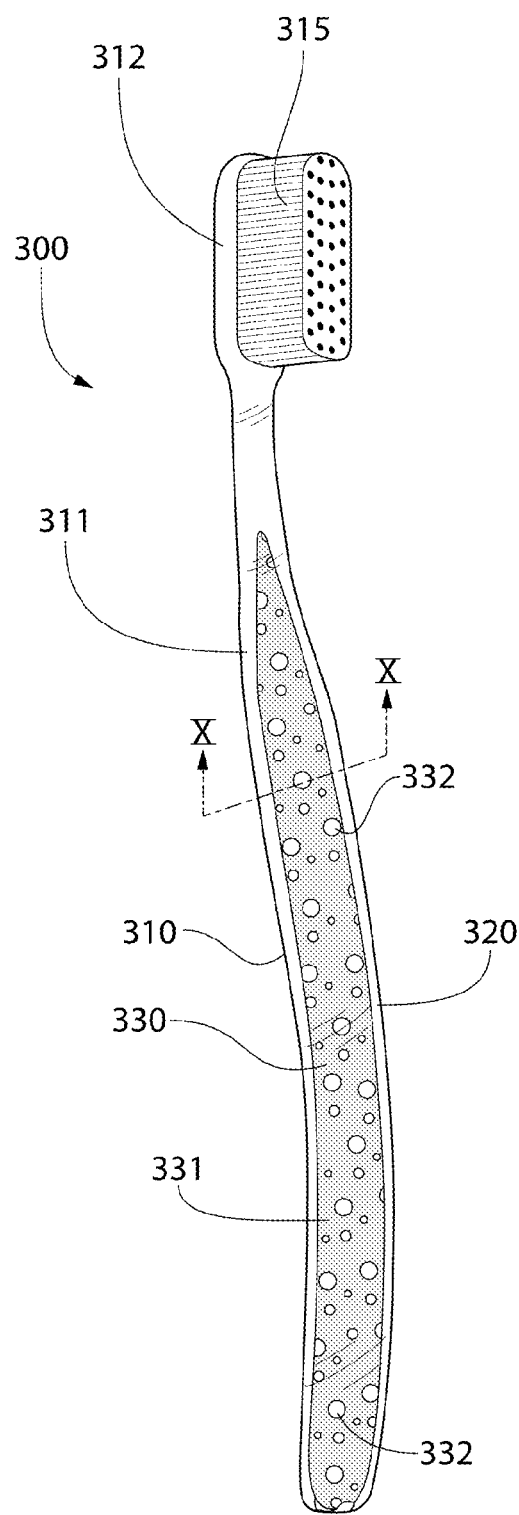
FIG. 8 is a front perspective view of an oral care implement in accordance with a third embodiment of the present invention.
Figure 9:
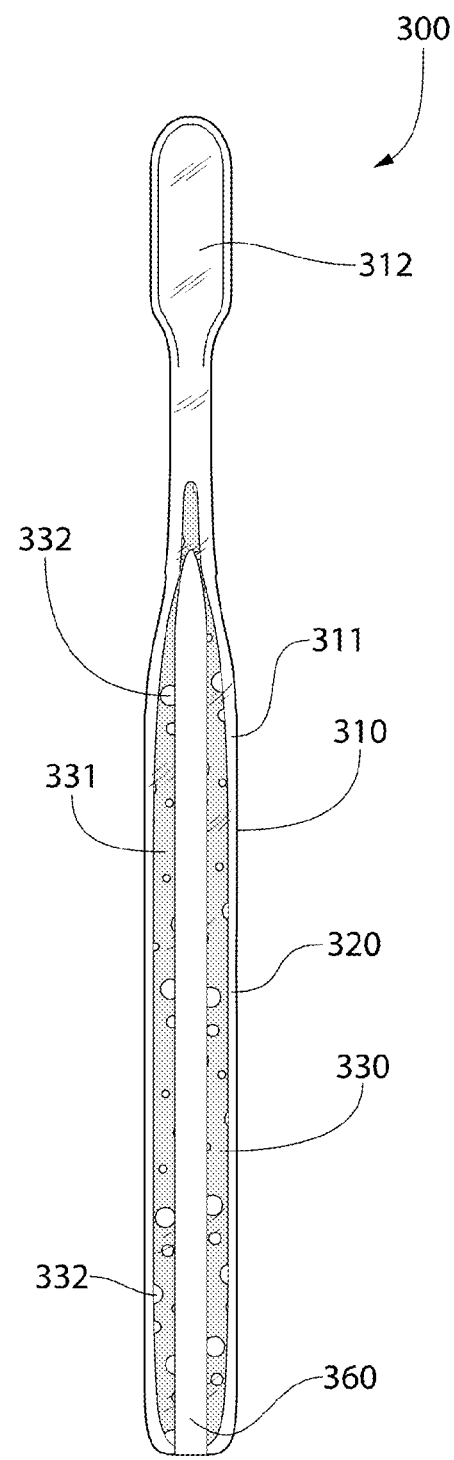
FIG. 9 is a rear view of the oral care implement of FIG. 8.
Figure 10:
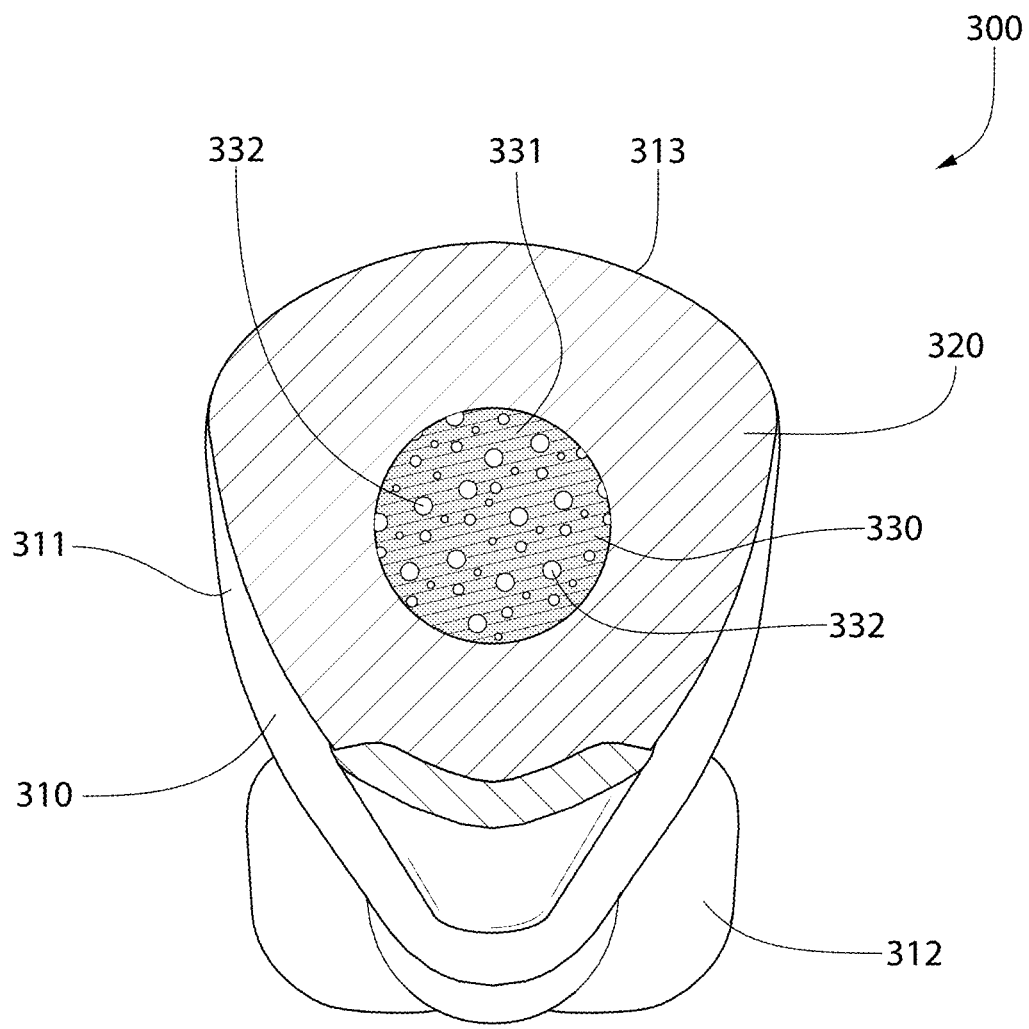
FIG. 10 is a cross-sectional view taken along line X-X of FIG. 9.

Referring now to FIGS. 8-10 concurrently, another embodiment of an oral care implement 300 will be described. The oral care implement 300 is similar to the oral care implement 100 in many respects, and thus features of the oral care implement 300 that are similar to or the same as features of the oral care implement 100 will not be described in detail herein it being understood that the description of the similar feature in the oral care implement 100 is applicable. Some of the features that are not described will be numbered similarly to the similar feature in the oral care implement 100 except that the 300-series of numbers will be used. Thus, the similar features among the oral care implements 100, 300 should be readily apparent based on the numbering used in the drawings.

The oral care implement 300 comprises a base structure 310 having a handle portion 311 and a head portion 312. Furthermore, the base structure 310 comprises a shell component 320 and a core component 330. The details of the shell component 320 are the same as that described above with regard to the shell component 120. Thus, the shell component 320 may be transparent or translucent and formed of a rigid material. The shell component 320 substantially surrounds and encapsulates the core component 330 such that no portion of the core component 330 extends to an outer surface 313 of the base structure 310. Rather, the entire outer surface 313 of the base structure 310 is formed by the shell component 320. The shell component 320, and not the core component 330, forms the head portion 312 of the base structure 310.

The core component 330 comprises a body 331 and a plurality of decorative elements 332. The body 331 is formed of a rigid material and may be transparent, translucent, opaque, or the like as described herein above. The main difference between the oral care implement 300 and the previously described oral care implements 100, 200 is that the decorative elements 332 in this embodiment are not particles, but rather they are gas bubbles or void spaces within the body 331. Thus, the body 331 may be an opaque material and the decorative elements 332 may be gas bubbles or void spaces within the opaque body 331 so that the gas bubbles or void spaces are readily visible to a consumer or user of the oral care implement 300. Such gas bubbles or void spaces are formed into the core component 330 by incorporating a foaming agent into the rigid material that forms the body 331 before injecting the rigid material of the body 331 into a mold cavity during an injection molding process. Examples of foaming agents that may be used in the practice of the present invention include, without limitation, Exocerol AB40E™, Hydrocerol™, or the like. When a foaming agent such as those noted herein above is included into the rigid material of the body 331, as the rigid material is heated to an elevated temperature (such as the temperatures reached during injection molding), the foaming agent generates a gas. Thus, as the rigid material with the foaming agent incorporated therein is injected into a mold cavity of a mold, the foaming agent will form gas bubbles or void spaces within the rigid material of the body 331. These gas bubbles or void spaces are visible to a user through the shell component 320, thereby forming the decorative elements 332 of the body component 330.

Incorporating a foaming agent into the material of the body 331 can create a desirable aesthetic effect by having the body 331 formed with gas bubbles/void spaces therein that are visible through the shell component 320. The gas bubbles/void spaces will be limited in location to regions of the base structure 310 that include the core component 330, which achieves a unique affect to a viewer or consumer. When the decorative elements 332 are gas bubbles/void spaces, it may be desirable for the body 131 to be colored, opaque, translucent, or simply not transparent so that the gas bubbles/void spaces are readily visible within the body 131. Of course, the invention is not to be so limited in all embodiments and in certain other embodiments the body 131 may be transparent and the decorative elements 332 may be gas bubbles/void spaces.

Figure 11:
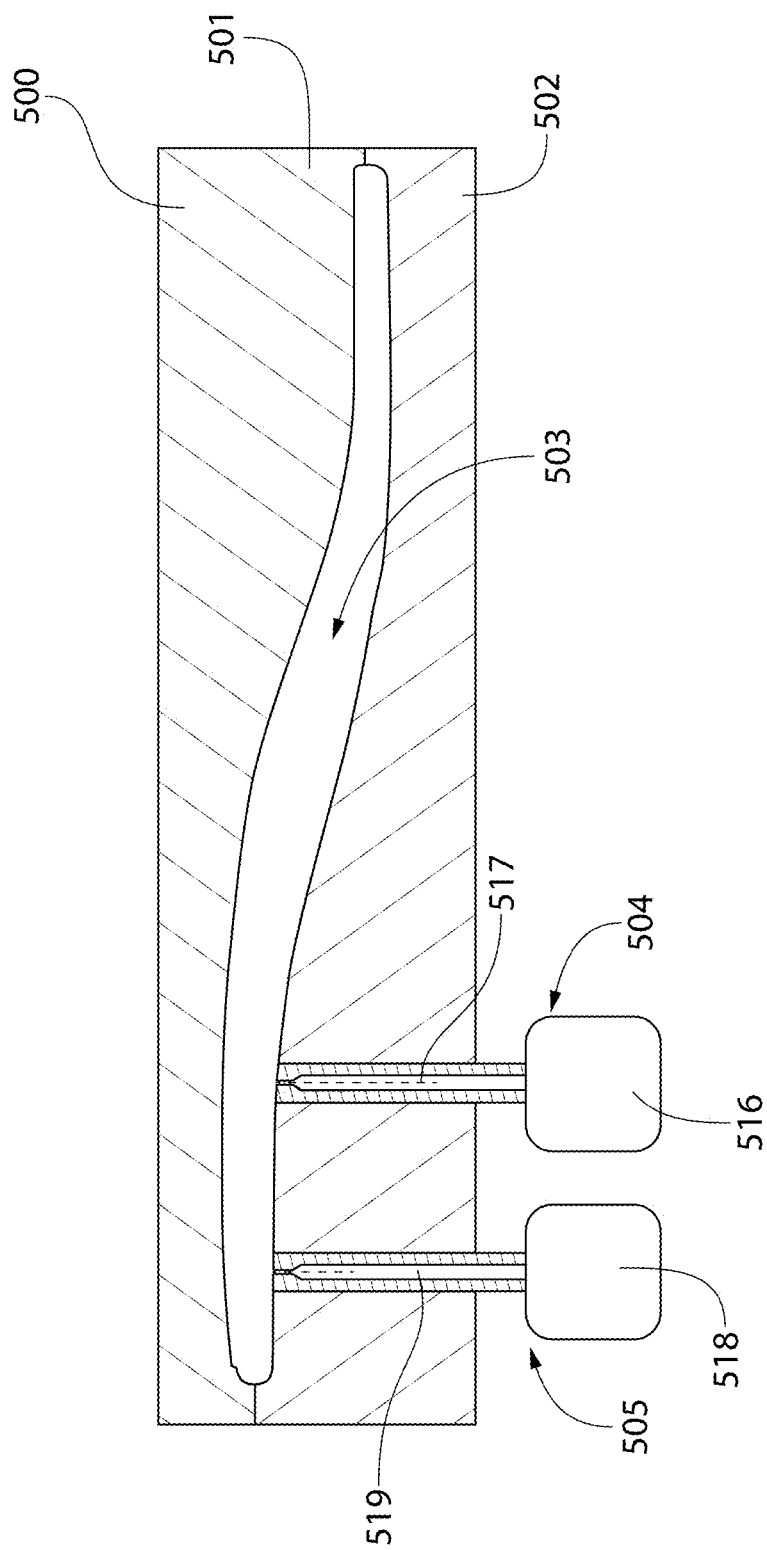
FIG. 11 is a schematic cross-sectional view of a first mold defining a first mold cavity and coupled to material injection subsystems.

Turning now to FIG. 11, a method of forming the base structure 110 of the oral care implement 100 of FIGS. 1-4A using a first mold 500 will be described. The base structure 110 of the oral care implement 100 may be formed in a single mold (i.e., the first mold 500) using a sandwich molding process as described herein. Alternatively, the base structure 110 may be formed by overmolding a first solid shot with a separately molded second shot, but such process would require two mold cavities instead of one.

In the exemplified embodiment, the first mold 500 comprises a first mold half 501 and a second mold half 502, although the invention is not to be so limited in all embodiments and more than two portions may make up the first mold 500 in other embodiments. The first and second mold halves 501, 502 collectively define a first mold cavity 503 within which the base structure 110 of the oral care implement 100 is formed as described herein below. The first mold cavity 503 has a size and shape that corresponds with a size and shape of the base structure 110 of the oral care implement 100 that is formed in the first mold cavity 503 of the first mold 500. In the exemplified embodiment, there is a first injection sub-system 504 and a second injection sub-system 505 for injecting different materials into the first mold cavity 503 in separate processing steps either simultaneously or sequentially. The first injection sub-system 505 includes a first reservoir 516 containing a first material to be injected and a first conduit 517 that forms a passageway from the first reservoir 516 into the first mold cavity 503 so that the first material can be injected into the first mold cavity 503 to form the shell component 120 of the base structure 110 of the oral care implement. The second injection sub-system 505 includes a second reservoir 518 containing a second material to be injected and a second conduit 519 that forms a passageway from the second reservoir 518 to the first mold cavity 503 so that the second material can be injected into the first mold cavity 503 to form the core component 130 of the base structure 110 of the oral care implement 100.

Figure 12:
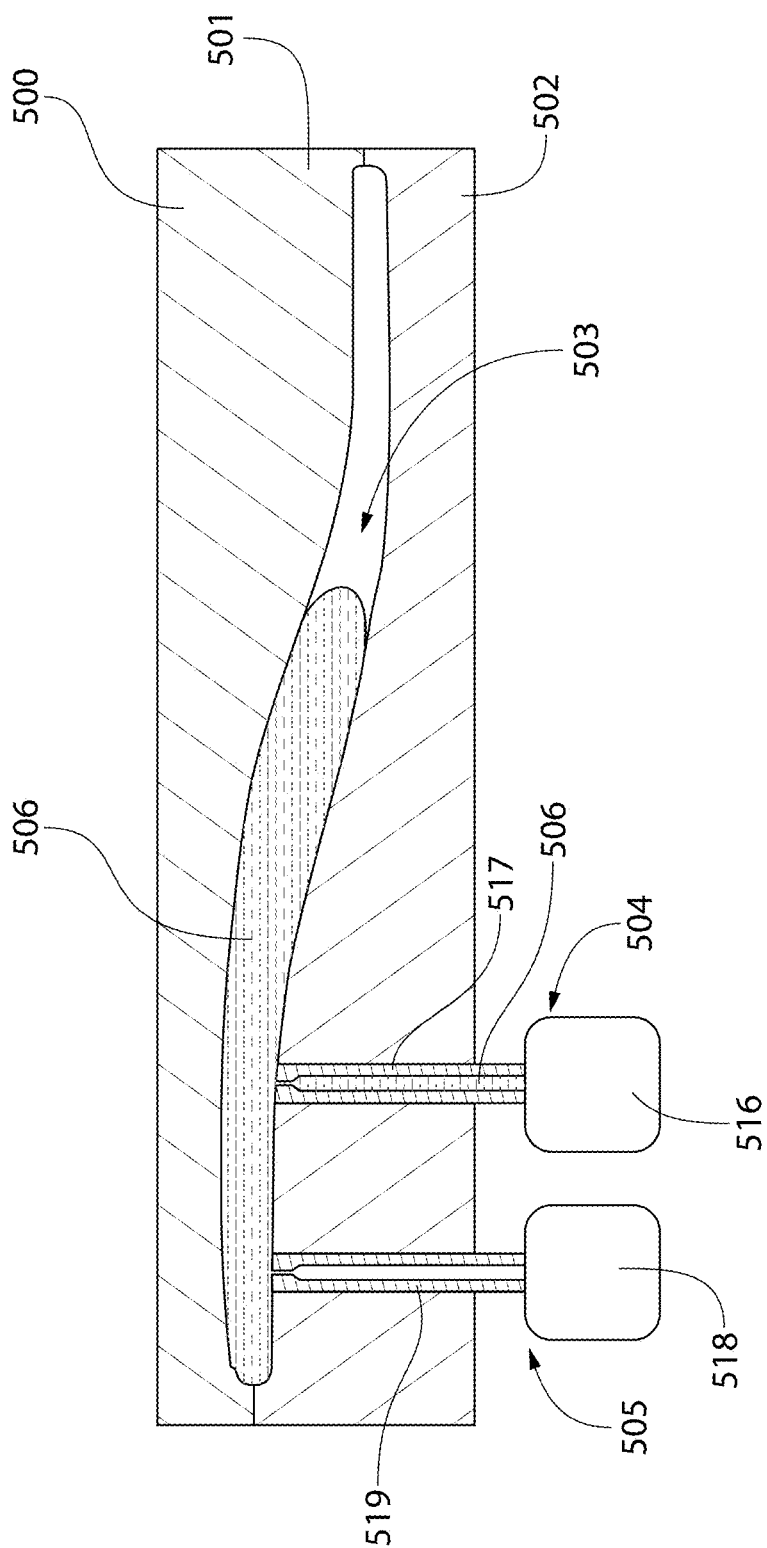
FIG. 12 is a schematic cross-sectional view of the first mold of FIG. 11, wherein a first material is being injected into the first mold cavity.

Referring to FIG. 12, the first mold 500 is illustrated with a first material 506 being injected into the first mold cavity 503 via the first injection sub-system 504. In this embodiment the first material 506 is a rigid plastic material in molten form due to it being injected at an elevated temperature. In certain embodiments the first material 506 is a substantially translucent rigid plastic material. The first material 506 forms the shell component 120 of the base structure 110 of the oral care implement 100. Thus, the first material 506 is injected into the first mold cavity 503 in a desired volume.

Figure 13:
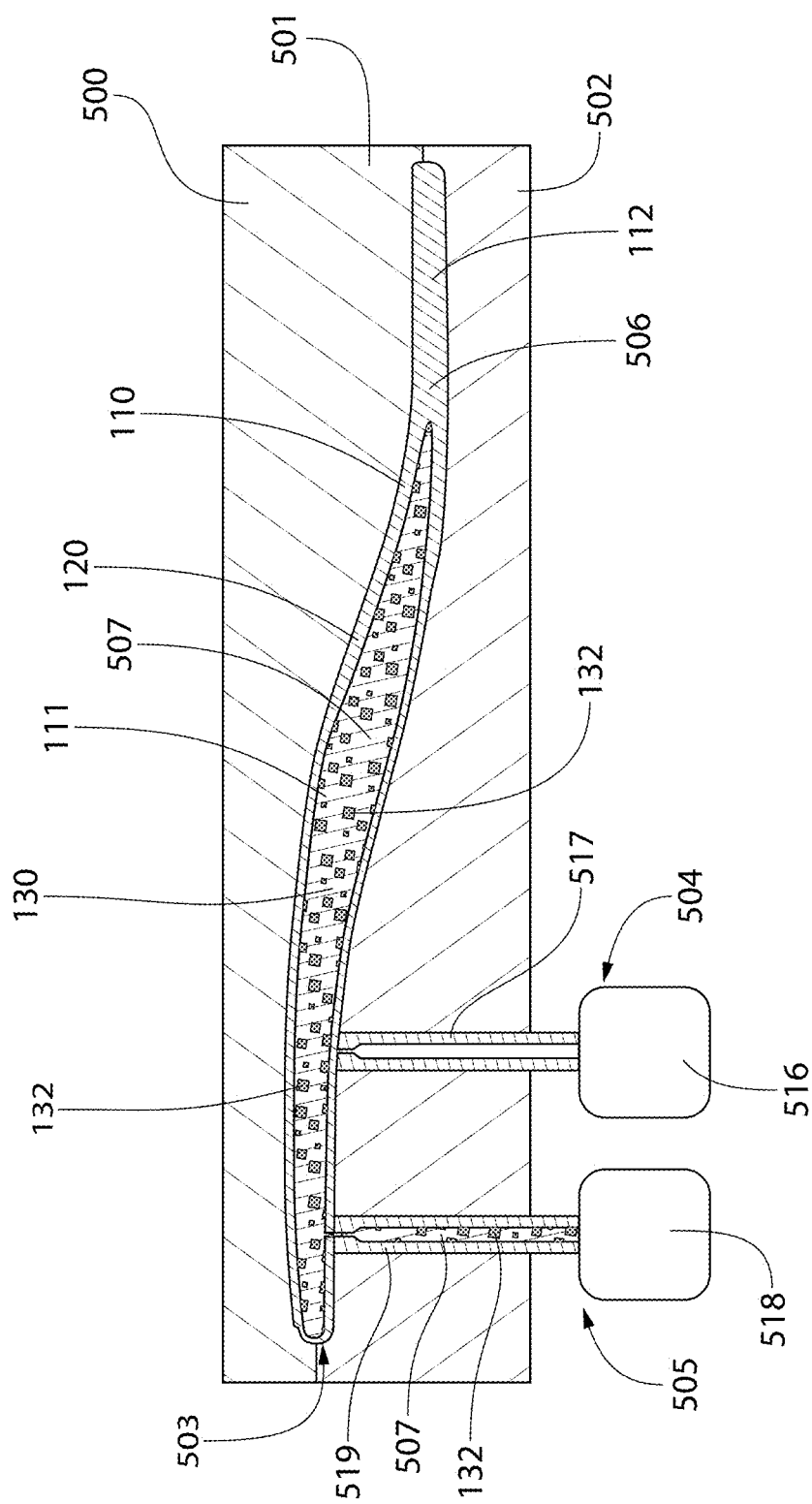
FIG. 13 is a schematic cross-sectional view of the first mold of FIG. 11, wherein a second material is being injected into the first mold cavity to form a base structure of an oral care implement.

Referring to FIG. 13, after a desired volume of the first material 506 is injected into the first mold cavity 503, the injection of the first material 506 is terminated and a second material 507 is injected into the first mold cavity 503 via the second injection sub-system 505. The second material 507 will form the body 131 of the core component 130 of the base structure 110. Specifically, the second material 507 is injected into the first material 506 in the first mold cavity 503. As the second material 507 is injected into the first material 506, the second material 507 displaces the first material 506 within the first mold cavity 503 and the second material 507 becomes surrounded or encased by the first material 506. The first and second materials 506, 507 together form the base structure 110 of the oral care implement 100. More specifically, the first material 506 forms the shell component 120 of the base structure 110 and the second material 507 forms the core component 130 of the base structure, the shell component 120 surrounding the core component 130 as described above.

Furthermore, as can be seen in FIG. 13, the plurality of decorative elements 132 are dispersed within the second material 507 as the second material 507 is injected into the first mold cavity 503. Thus, after the first and second materials 506, 507 are injected into the first mold cavity 503 and cooled to harden, the decorative elements 132 are embedded within the body 131 of the core component 130 formed by the second material 507. Because the first material 506 is substantially translucent, the plurality of decorative elements 132 are visible through the first material 506 of the shell component 120 in the completed base structure 110. As can also be seen, the first material 506 forms the shell component 120 of the base structure 110 and the head portion 112 of the base structure 110.

In the embodiment exemplified in FIGS. 11-13, the plurality of decorative elements 132 are particles as described herein above. Furthermore, the second material 507 may be transparent, translucent, or opaque to create a desired aesthetic effect. Although FIGS. 11-13 are described herein wherein the decorative elements 132 are particles that are dispersed within the second material 506 before the second material 506 is injected into the first mold cavity 503, the invention is not to be so limited in all embodiments. In certain other embodiments, the decorative elements 132 may be gas bubbles or void spaces formed within the second material 507 during injection of the second material 507 into the first mold cavity 503. Specifically, in such embodiments the second material 507 may include a foaming agent such that during injection molding the second material 507 is heated to a sufficient temperature so that the foaming agent generates gas that forms the gas bubbles/void spaces within the second material 507 as described above. Thus, the decorative elements 132 may be particles dispersed within the second material 507 prior to injecting the second material 507 into the first mold cavity 503 or gas bubbles that are formed during the injection of the second material 507 into the first mold cavity 503.

After the first and second materials 506, 507 are injected into the first mold 500 and allowed to cool and harden, the base structure 110 is completely formed. At this stage, the base structure 110 can be removed from the first mold 500 and tooth cleaning elements can be attached to the head portion 112 of the base structure 110 to form a finished toothbrush product. Alternatively, the base structure 110 may be used as a hairbrush, razor, or the like as discussed herein above.

Figure 14:
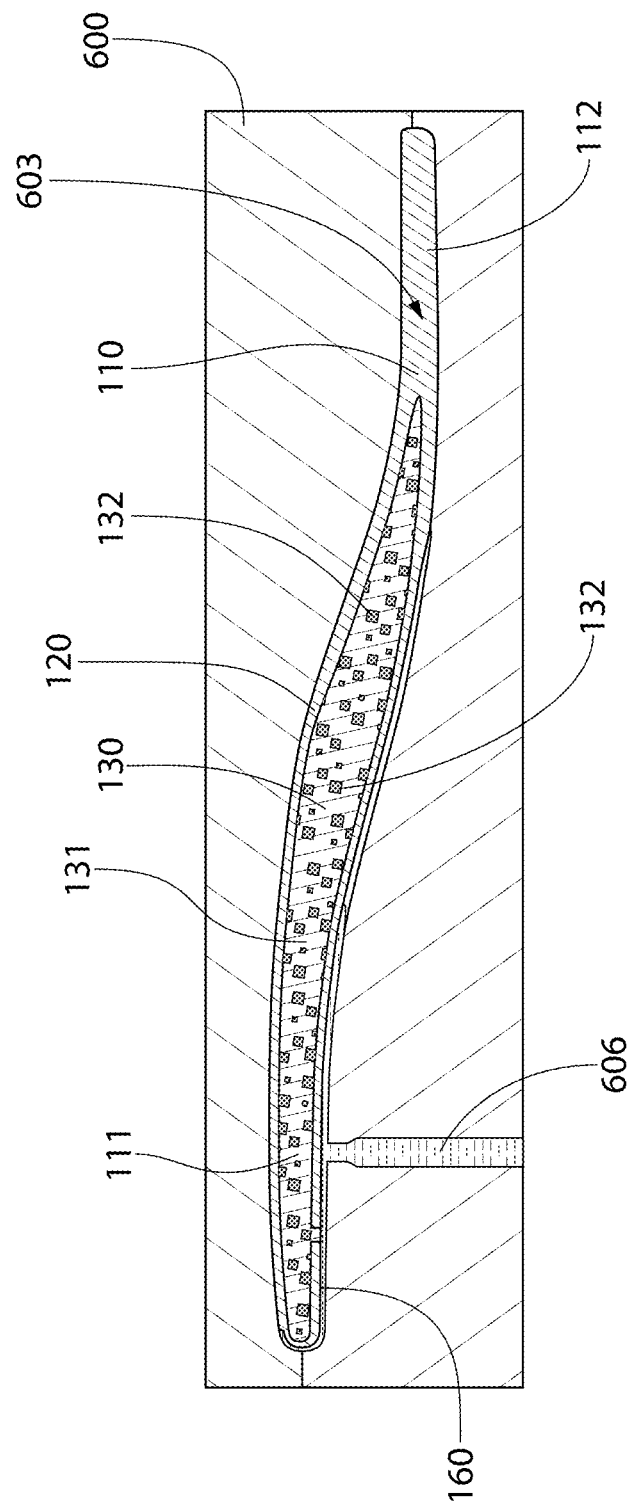
FIG. 14 is a schematic cross-sectional view of the base structure of FIG. 13 positioned within a second mold, wherein a third material is being injected into a second mold cavity of the second mold.
Figure 15:
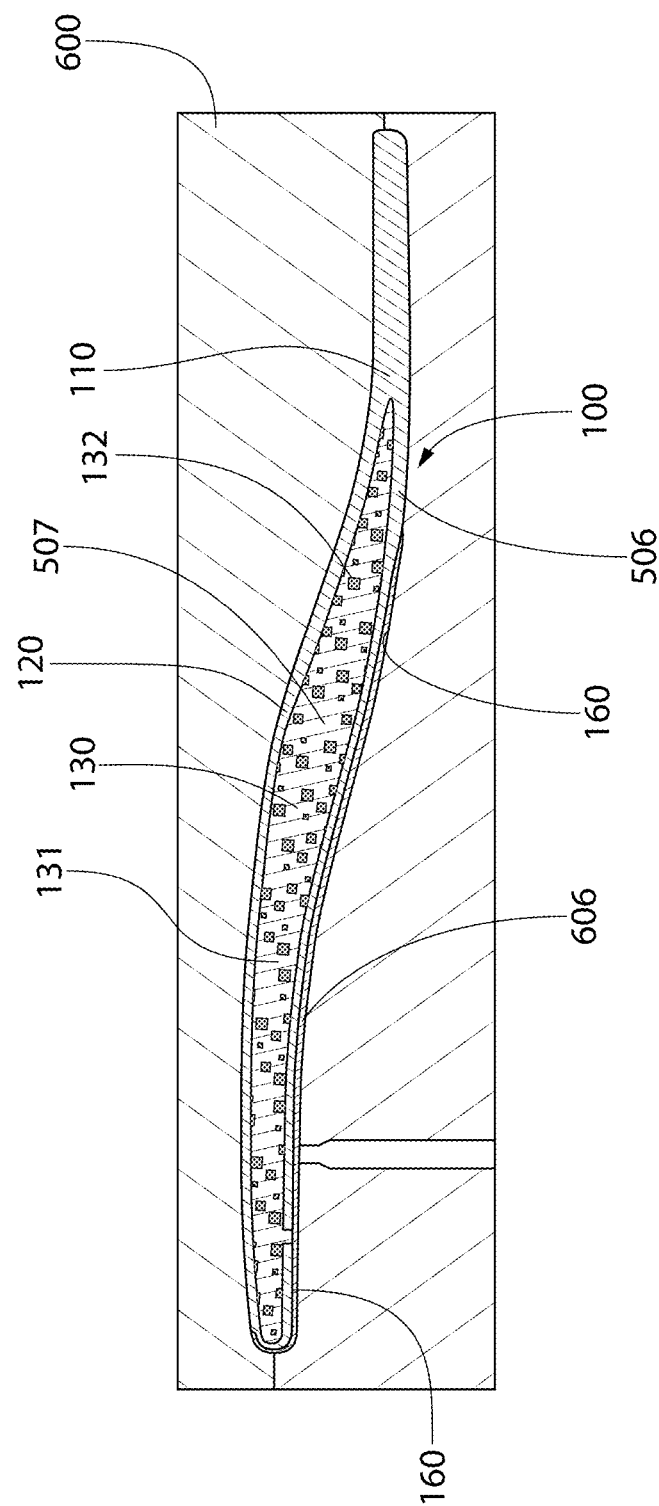
FIG. 15 is a schematic cross-sectional view of the oral care implement positioned within the second mold cavity of the second mold.

In certain embodiments, the base structure 110 may be removed from the first mold cavity 503 of the first mold 500 and placed within a second mold cavity 603 of a second mold 600 wherein a third material may be injected onto the base structure 110 to form a grip for the oral care implement 100. Referring to FIG. 14, the base structure 110 is positioned within the second mold cavity 603 of the second mold 600. While the base structure 110 is so positioned, a third material 606 is injected into the second mold cavity 603 to fill in the spaces of the second mold cavity 603 that are not filled by the base structure 110. In certain embodiments, the third material 606 may be a thermoplastic elastomer or other elastomeric material to form the elastomeric overlay 160 for functioning as a grip on the base structure 110 as noted herein above. FIG. 15 illustrates the oral care implement 100 including the base structure 110 comprising the first material 506 that forms the shell component 120 and the second material 507 that forms the core component 130 and also including the third material 606 that forms the elastomeric overlay 160 coupled to the base structure 110. At this point in the manufacturing process, the oral care implement 100 can be removed from the second mold 600 and finalized for sale by adding tooth cleaning elements, hair brush bristles, or the like to the oral care implement 100 before packaging and transport to retail locations.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An oral care implement comprising:
a base structure comprising a core component and a shell component surrounding the core component;
the shell component comprising a substantially translucent first rigid material, the shell component being monolithic; and
the core component comprising a solid, non-hollow, body formed of a second rigid material and a plurality of decorative elements, the plurality of decorative elements embedded within and dispersed throughout the second rigid material and visible through the shell component; wherein the plurality of decorative elements comprises at least one decorative element that is embedded within the second rigid material of the body and at least one decorative element that protrudes from an outer surface of the body;
wherein the plurality of decorative elements comprises discrete particles.

2. The oral care implement according to claim 1 wherein the base structure comprises a handle portion and a head portion, and further comprising tooth cleaning elements coupled to and extending from the head portion.

3. The oral care implement according to claim 2 wherein the shell component and the base component collectively form the handle portion of the base structure and wherein the shell component forms an entirety of the head portion of the base structure such that the core component does not extend to the head portion of the base structure.

4. The oral care implement according to claim 2 wherein the core component tapers towards the head portion of the base structure.

5. The oral care implement according to claim 1 wherein the shell component completely encapsulates the core component so that an entirety of an outer surface of the base structure is formed by the shell component and no portion of the core component is exposed on the outer surface of the base structure.

6. The oral care implement according to claim 1 further comprising a grip component formed of a thermoplastic elastomer covering at least a portion of the base structure.

7. The oral care implement according to claim 1 wherein the body is opaque.

8. The oral care implement according to claim 1 wherein the plurality of decorative elements comprises a plurality of particles embedded within the second rigid material of the body.

9. The oral care implement according to claim 8 wherein the body comprises a first color and at least one of the particles comprises a second color that is different than the first color.

10. The oral care implement according to claim 8 wherein the body is transparent or translucent and the plurality of particles are opaque.

11. The oral care implement according to claim 8 wherein the plurality of particles are selected from the group consisting of speckles, sparkles, flakes, glitter, microspheres, and pearlescent particles.

12. An oral care implement comprising:
a base structure comprising a handle portion and a head portion, tooth cleaning elements extending from the head portion;
the handle portion comprising a core component and a shell component, the shell component encapsulating the core component and forming an outer surface of the base structure;
the shell component formed of a substantially translucent first material; and
the core component comprising a body formed of a second rigid material and a plurality of decorative elements embedded within the second rigid material, at least one of the plurality of decorative elements forming a portion of an outer surface of the core component, the at least one of the plurality of decorative elements of the core component being visible through the substantially translucent first material of the shell component;
wherein the plurality of decorative elements comprises discrete particles.

13. The oral care implement according to claim 12 further comprising a grip component formed of a thermoplastic elastomer overmolded to the outer surface of the base structure.

14. The oral care implement according to claim 12 wherein the body is opaque.

15. The oral care implement according to claim 12 wherein the body is transparent or translucent.

16. The oral care implement according to claim 12 wherein the first material that forms the shell component is a rigid material.

17. The oral care implement according to claim 12 wherein the at least one of the plurality of decorative elements is located at an interface between the shell component and the core component.

18. The oral care implement according to claim 12 wherein the at least one of the plurality of decorative elements is exposed at the outer surface of the core component.

19. The oral care implement according to claim 12 wherein at least one of the plurality of decorative elements protrudes from an outer surface of the body of the core component.

20. An oral care implement comprising:
a base structure comprising a handle portion and a head portion, tooth cleaning elements extending from the head portion;
the handle portion comprising a core component and a shell component, the shell component encapsulating the core component and forming an outer surface of the base structure;
the shell component formed of a substantially translucent first material; and
the core component comprising a body formed of a second rigid material and a plurality of decorative elements embedded within the second rigid material, a first one of the plurality of decorative elements forming a portion of an outer surface of the core component, the plurality of decorative elements of the core component being visible through the substantially translucent first material of the shell component;
wherein the plurality of decorative elements comprises gas bubbles that form void spaces within the second rigid material of the body.

* * * * *